United States Patent [19]
Lamme

[11] 3,833,266
[45] Sept. 3, 1974

[54] COMBINED BRACKET AND LUG NUTS FOR WHEEL COVERS

[75] Inventor: Robert E. Lamme, Hialeah, Fla.

[73] Assignee: High Hill, Inc., North Miami, Fla.

[22] Filed: July 9, 1973

[21] Appl. No.: 377,774

[52] U.S. Cl. ............... 301/37 AT, 301/37 R, 70/171
[51] Int. Cl. .............................................. B60b 7/00
[58] Field of Search ........ 301/37 AT, 37 C, 37 CM, 301/37 SC, 108 SC, 108 S; 70/169, 259, 171

[56] References Cited
UNITED STATES PATENTS

| | | | |
|---|---|---|---|
| 2,124,035 | 7/1938 | Hurd | 70/169 |
| 2,328,301 | 8/1943 | Shaw, Jr. | 70/259 |
| 2,535,126 | 12/1950 | Flowers | 70/169 |
| 3,170,733 | 2/1965 | Lamme | 70/169 |
| 3,248,915 | 5/1966 | Scheiman | 301/37 AT |
| 3,317,247 | 5/1967 | Lamme | 70/171 |

Primary Examiner—M. Henson Wood, Jr.
Assistant Examiner—Victor N. Sakran

[57] ABSTRACT

A combined bracket and lug nuts for automobile wheel covers having a hub portion with a centrally disposed opening for receiving the barrel of a lock and a plurality of flexible leg portions extending in one direction thereof at an oblique angle with tab portions extending from the free end of the leg portions in a plane parallel to the hub portion. The tab portions are provided with open ended slots that are seated in peripheral slots formed in lug nuts by flexing the flexible leg portions beyond the position of the lug nuts and releasing the leg portions to permit the tabs to be received by the peripheral slots in the lug nuts.

3 Claims, 7 Drawing Figures

COMBINED BRACKET AND LUG NUTS FOR WHEEL COVERS

BACKGROUND OF THE INVENTION

1. Field Of The Invention

This invention is related to wheel covers for automobiles and is more particularly directed to a bracket and lug combination for the wheel covers.

2. Description of The Prior Art

In the conventional wheel covers wherein a lock is provided for locking the wheel covers to the wheel, a bracket is used that is fastened to the brake drum by means of the same wheel nuts that secure the wheel to the drum. However, as in my U.S. Pat. No. 3,170,733 and No. 3,317,247, the brackets are provided with bores through which the studs extend and the brackets are interposed between the lug nut and the wheel wall. The disadvantages of this construction are as follows:

Normally the wheel of an automobile is supported directly on the lug nuts by virtue of the fact that the nuts have a beveled inner face portion that engages a matching beveled portion at the bores in the wheel wall. This is a vital safety feature since the nuts are prevented from becoming loosened upon the turning of the wheels during normal use of the automobile. By interposing a bracket between the lug nuts and wheel, the wheel becomes supported directly on the lugs and any relative movement between the lugs and the wheel, the wheel will cause the bracket to wear on that portion positioned between the wheel and nut so that the lug nut can become loosened.

Also, the lug nuts and bracket have to be removed in order to gain access to the grease cap since the brackets completely enshroud the grease cap. Last but not least, the presence of the conventional brackets for wheel covers that lock in place make it cumbersome to remove or replace a wheel on the drum. The present invention readily avoids all of the above indicated problems created by the use of a wheel cover that may be locked in position on an automobile wheel.

SUMMARY OF THE INVENTION

Therefore, a principal object of the present invention is to provide a wheel cover of an automobile that locks onto an automobile wheel with a bracket which is readily mounted in position and is just as readily removed from the wheels without having to remove the lug nuts.

Another object of the present invention is to provide a wheel cover that locks in position with a bracket which permits the weight of the automobile to be borne directly on the lug nuts with the lug nuts tightened against the wheel face and not having a bracket interposed between the lug nuts and wheel face.

A further object of the present invention is to provide a locking wheel cover with a bracket having leg portions that flex inwardly to engage and be secured to lug nuts having a peripheral slot so that the bracket may be removed from the wheel without having to jack up the automobile and remove the lug nuts, but by merely flexing the leg portions outwardly of the lug nuts.

A still further object of the present invention is to provide a wheel cover with a bracket that permits access to the grease cup without the necessity of removing or loosening the lug nuts prior thereto.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 2:
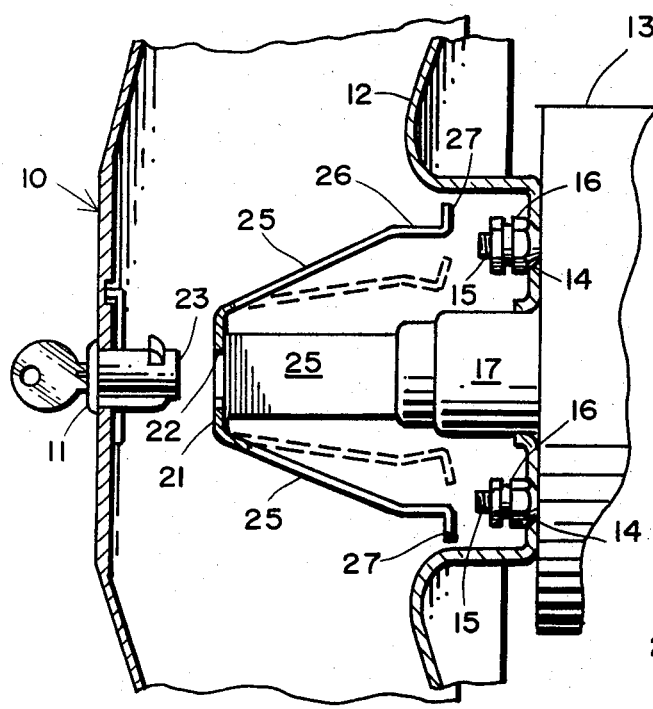
FIG. 2 is a similar exploded view.
Figure 7:
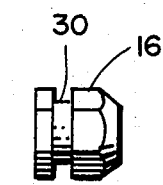
FIG. 7 is an enlarged view of the lug nut.
Figure 5:
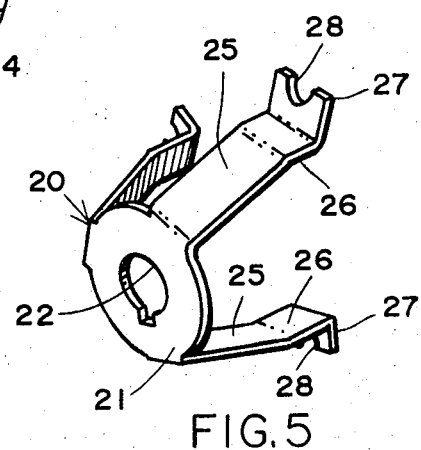
FIG. 5 is a perspective view of the bracket.

Referring to the drawings wherein like numerals re used to designate similar parts throughout the several views, the numeral 10 refers to a wheel cover having a locking device 11 for securing the wheel cover to a wheel 12. The wheel 12 which is secured in a conventional manner to a brake drum 13 is provided with a plurality of openings 14 through which threaded lugs 15 extend. Nuts 16 threaded on the lugs 15 fasten the wheels 12 to the drum 13 and also releasably retain a support bracket 20 thereon as explained in detail hereinafter. A conventional grease cap 17 is mounted over the axle of the wheel that extends through the drum 13.

A support bracket 20 is provided with a central hub like portion 21 having an opening 22 through which the barrel 23 of the locking device 11 extends. A plurality of leg portions 25 extend at an inclined angle to the hub portion 21. Adjacent its end portion there is a portion 26 normal to the face of the drum 13 terminating in an inwardly extending tab portion 27 having a semicircular opening 28 that extends to the outer edge of the tab portion 27.

The nuts 16 that are threadedly mounted on the lugs 15 to secure the wheels 12 to the drum 13 are each provided with a peripheral groove 30 about its midportion to receive the slotted opening 28 of the tab portions 27. The leg portions 25 being substantially resilient will flex inwarldy as shown by the dotted line positions in FIG. 2 to permit the tab portions 27 to swing radially inwardly of the position of the nuts 16. When the leg portions 25 are released and permitted to return to their normal position, the tab portions 27 will be received by the peripheral grooves 30 and are firmly seated therein. The tabs 27 can be removed from their position on the nuts 16 only upon flexing the leg portions 25 inwardly to release the tabs 27 from the peripheral grooves 30 of the nuts 16.

Figure 1:
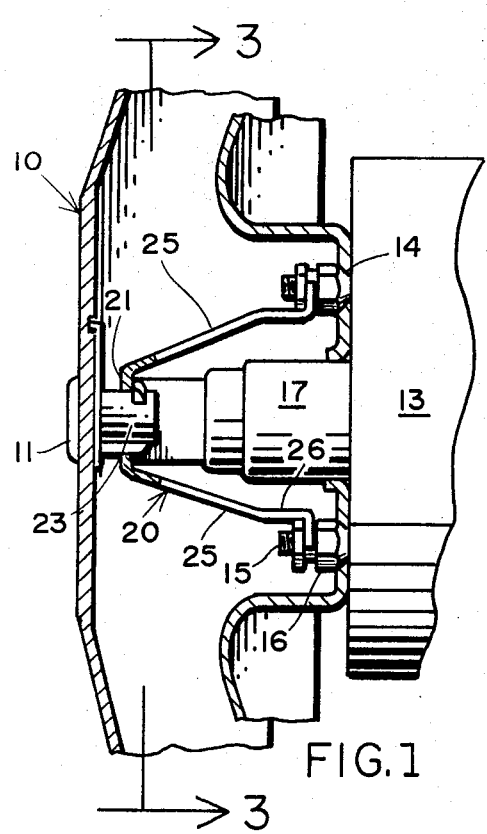
FIG. 1 is a fragmentary cross sectional view taken along the line 1—1 of FIG. 3 showing a bracket for a wheel cover constructed in accordance with my invention.

In the normal use of my improved bracket 20 after the lug nuts 16 have been threaded on the lugs 15 to secure the wheel 12 directly onto the brake drum 13, the bracket 20 is then placed in position thereon by merely flexing the leg portions 25 inwardly to the dotted line positions shown by FIG. 2. The tabs 27 are then placed inwardly of and in alignment with the peripheral grooves 30 of the lug nuts 16. The leg portions 25 are then released and permitted to flex outwardly to seat the tabs 27 in the peripheral grooves 30 thereby securing the bracket 20 to the brake drum 13. Now all that need be done is lock the wheel cover 10 to the wheel 12 by inserting the barrel 23 of the lock 11 into the opening 22 until the lock 11 snaps into its locked postion as shown by FIG. 1. Now the wheel cover 10 can be removed only by use of a key in the lock 11 to retract the lock bolt and permit the barrel 23 to slide outwardly of the hub opening 22. After the wheel cover 10 has been removed, the leg portions 25 are then flexed inwardly of the lug nuts 16 to release the tabs 27 from the peripheral slots 30. Now the nuts 16 may be removed if it is desired to remove the wheel 12.

Figure 3:
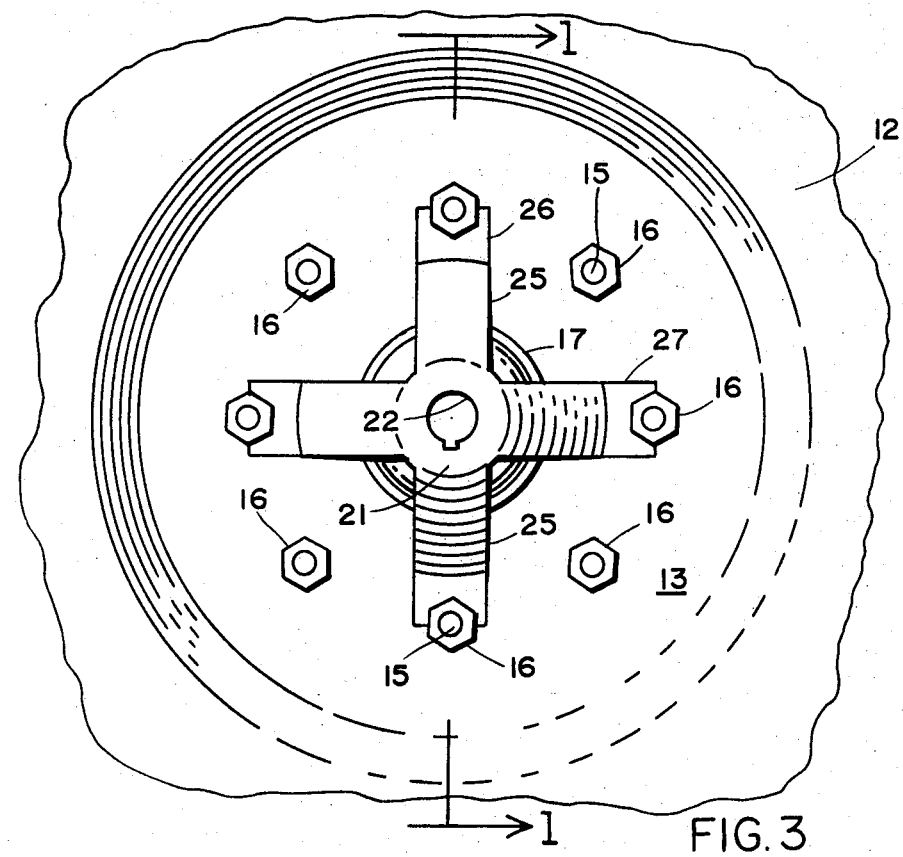
FIG. 3 is a cross sectional view taken along the line 3—3 of FIG. 1.
Figure 4:
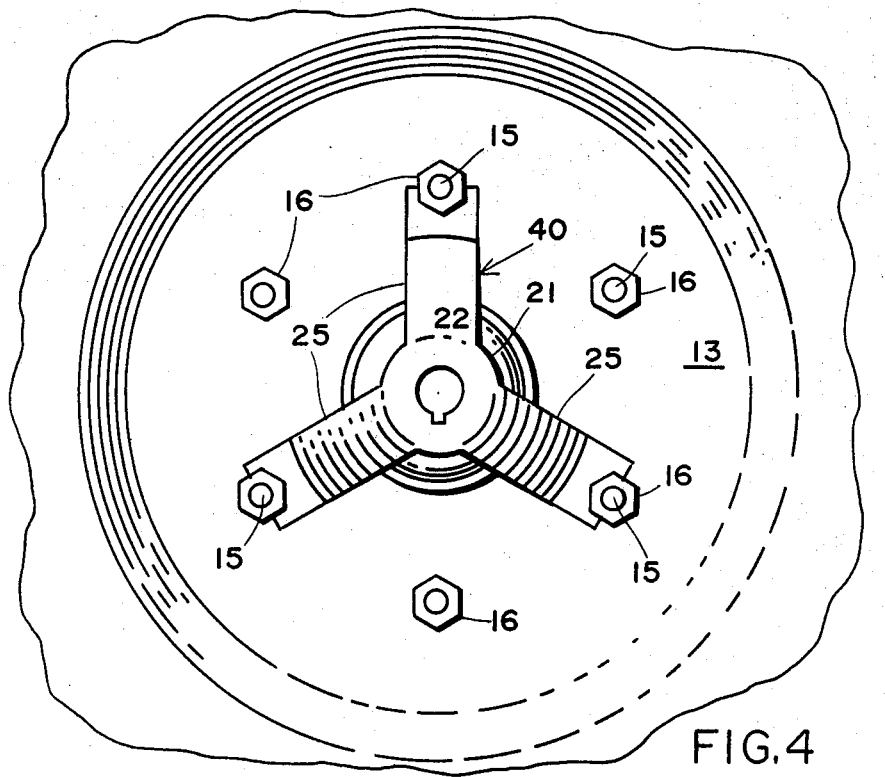
FIG. 4 is a similar view of an alternate construction of my bracket.

If the wheel 12 is provided with 4 or 8 lugs 15, then the wheel bracket 20 will be formed with four symmetricaly disposed leg portions 25 as shown by FIG. 3. However, if there are six lugs 15 as shown by FIG. 4 the bracket 40 is then provided with three symmetrically disposed leg portions 25. In order to not cause an imbalance of the wheels 12, the leg portions 25 must be symmetrically disposed about the central hub 21, otherwise the wheel will have to be placed in balance.

Figure 6:
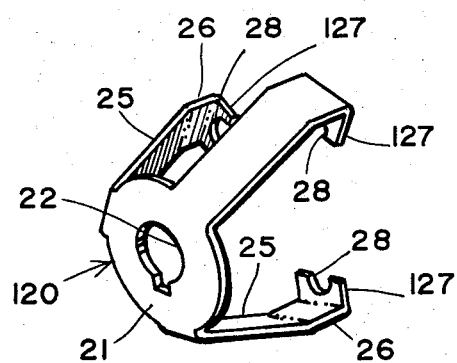
FIG. 6 is a further alternate construction of my bracket.

As shown by FIG. 6, an alternate structure of a bracket 120 is shown. The bracket 120 is identical to the bracket 20 described hereinabove except that the tab portions 127 extend inwardly rather than outwardly. In the mounting of the bracket 120 on the wheel 12, the leg portions 25 are flexed outwardly until the tab portions 127 are positioned outwardly of the lug nuts 16 at the position of the peripheral grooves 30. When the leg portions 25 are released, the leg portions 25 will swing inwardly toward their normal position and the slotted portions 28 will be centered on the lug nuts at the position of the peripheral slots 30 to engage the tabs 127. To remove the bracket, the leg portions 25 are flexed outwardly until the tabs 127 leave the peripheral slots 30 of the lug nuts 16.

Having described my invention, what I claim and desire to secure by letters Patent is:

1. A combined bracket and lug nuts for wheel covers comprising: a hub portion having a centrally disposed bore for a lock barrel, a plurality of elongated substantially symmetrically disposed leg portions extending at an oblique angle from said hub portion, tab portions extending from free ends of said leg portions and lying in a plane substantially parallel to that of said hub portion, substantially semi-circular slotted portions formed on said tab portions and extending to the free edge of said tab portions, and lug nuts, adapted to be threaded on lugs for securing a wheel to a drum having a peripheral groove for receiving said slotted portions of said tabs and securing said bracket to said lug nuts said leg portions being resilient permitting the flexing of said leg portions and sliding said slotted portions of said tab portions into said peripheral groove of said lug nuts.

2. The structure as recited by claim 1 wherein said tab portions extend outwardly in a general direction away from each other.

3. The structure as recited by claim 1 wherein said tab portions extend inwardly in a general direction toward each other.

* * * * *